(12) United States Patent
Tran et al.

(10) Patent No.: US 7,797,565 B1
(45) Date of Patent: *Sep. 14, 2010

(54) SYSTEM AND METHOD FOR MAINTAINING COMMUNICATION PROTOCOL CONNECTIONS DURING FAILOVER

(75) Inventors: Cuong Huu Tran, Los Altos, CA (US); Bhavin K. Thaker, Sunnyvale, CA (US); Veeral P. Shah, Mumbai (IN)

(73) Assignee: Symantec Operating Corporation, Mountain View, CA (US)

( * ) Notice: Subject to any disclaimer, the term of this patent is extended or adjusted under 35 U.S.C. 154(b) by 904 days.

This patent is subject to a terminal disclaimer.

(21) Appl. No.: 11/397,059

(22) Filed: Apr. 4, 2006

(51) Int. Cl.
*G06F 11/00* (2006.01)
(52) U.S. Cl. .................. 714/4; 714/10; 714/11; 714/12; 714/13; 714/43; 714/48; 709/223; 709/224
(58) Field of Classification Search .................. None
See application file for complete search history.

(56) References Cited

U.S. PATENT DOCUMENTS

| | | | |
|---|---|---|---|
| 6,393,581 B1 | 5/2002 | Friedman et al. ............... 714/4 |
| 7,076,555 B1 | 7/2006 | Orman et al. ............... 709/227 |
| 7,159,234 B1 | 1/2007 | Murphy et al. ............... 725/87 |
| 7,418,633 B1* | 8/2008 | Salpekar et al. ............... 714/43 |
| 7,444,536 B1 | 10/2008 | Jairath ............... 714/4 |
| 2002/0129146 A1* | 9/2002 | Aronoff et al. ............... 709/225 |
| 2003/0028817 A1 | 2/2003 | Suzuyama et al. ............... 714/4 |
| 2003/0126315 A1* | 7/2003 | Tan et al. ............... 710/1 |
| 2003/0210651 A1* | 11/2003 | Tzeng et al. ............... 370/231 |
| 2004/0042412 A1 | 3/2004 | Fan ............... 370/252 |
| 2004/0153709 A1 | 8/2004 | Burton-Krahn ............... 714/4 |
| 2004/0268175 A1 | 12/2004 | Koch et al. ............... 714/4 |
| 2005/0050392 A1 | 3/2005 | Baba et al. ............... 714/25 |
| 2005/0071470 A1* | 3/2005 | O'Brien et al. ............... 709/226 |
| 2005/0086342 A1 | 4/2005 | Burt et al. ............... 709/224 |
| 2005/0138461 A1 | 6/2005 | Allen et al. ............... 714/4 |
| 2005/0144289 A1 | 6/2005 | Yoshiuchi et al. ............... 709/227 |
| 2005/0173645 A1 | 8/2005 | Endo ............... 250/370.11 |
| 2005/0273645 A1 | 12/2005 | Satran et al. ............... 714/4 |
| 2006/0047836 A1 | 3/2006 | Rao et al. ............... 709/229 |
| 2006/0090097 A1 | 4/2006 | Ngan et al. ............... 714/6 |
| 2006/0164974 A1 | 7/2006 | Ramalho et al. ............... 370/219 |
| 2006/0179147 A1* | 8/2006 | Tran et al. ............... 709/227 |
| 2006/0248213 A1 | 11/2006 | Sherer et al. ............... 709/231 |
| 2007/0198710 A1 | 8/2007 | Gopalakrishnan ............... 709/225 |
| 2008/0046971 A1 | 2/2008 | Swander ............... 726/3 |
| 2008/0313274 A1 | 12/2008 | Murray et al. ............... 709/203 |

(Continued)

OTHER PUBLICATIONS

Cuong Tran, et al., "System and Method for Connection Failover Using Redirection," U.S. Appl. No. 11/052,644, filed Feb. 7, 2005, pp. 1-70.

(Continued)

*Primary Examiner*—Emerson C Puente
(74) *Attorney, Agent, or Firm*—Campbell Stephenson LLP (57) ABSTRACT

Various methods and systems for maintaining a communication protocol connection during a failover are disclosed. One method involves obtaining a first value of a parameter associated with a communication protocol connection between a primary node and a client and sending a flow control message to the client, in response to detecting that the primary node is failed. The flow control message includes the parameter.

21 Claims, 3 Drawing Sheets

U.S. PATENT DOCUMENTS

2009/0219805 A1    9/2009    Appanna et al. ............ 370/219

OTHER PUBLICATIONS

Lorenzo Alvisi et al., "Wrapping Server-Side TCP to Mask Connection Failures," from Proc. IEEE INFOCOM, Anchorage, Alaska, 2001, pp. 1-9.

Navid Aghdaie et al., "Client-Transparent Fault-Tolerant Web Service," from 20th IEEE International Performance Computing and Communications Conference, Phoenix, Arizona, 2001, pp. 209-216.

Navid Aghdaie et al., "Implementation and Evaluation of Transparent Fault-Tolerant Web Service with Kernel-Level Support," from $11^{th}$ IEEE International Performance Computer Communications and Networks Conference, Miami, Florida, Oct. 2002, pp. 63-68.

Werner Almesberger, "TCP Connection Passing," Proceedings of the Linux Symposium, vol. One, Jul. 21-Jul. 24, 2004, Ottawa, Ontario Canada, pp. 1-16.

Navid Aghdaie et al. "Fast Transparent Failover for Reliable Web Service," from Proc. $15^{th}$ IASTED International Conference on Parallel and Distributed Computing and Systems (PDCS), Marina Del Ray, California, Nov. 2003, pp. 1-6.

Using Oracle Real Application Clusters (RAC) *DataDirectConnect for ODBC*, DataDirect Technologies, Jul. 2004, pp. 1-11.

"Client Failover Best Practices for Highly Available Oracle Databases: Oracle Database l0g Release 2," *Oracle Maximum Availability Architecture White Paper*, Mar. 2006, pp. 1-23.

Tran et al., pending U.S. Patent Application entitled "System and Method for Rapidly Ending Communication Protocol Connections in Response to Node Failure," U.S. Appl. No. 11/395,915; Non-Final Office Action, mail date Mar. 13, 2009, 17 pages.

\* cited by examiner

SYSTEM AND METHOD FOR MAINTAINING COMMUNICATION PROTOCOL CONNECTIONS DURING FAILOVER

FIELD OF THE INVENTION

This invention relates to computing systems and, more particularly, to clustered computing systems.

DESCRIPTION OF THE RELATED ART

Clustering involves multiple computer systems, also referred to as nodes, cooperating with each other in order to provide increased availability and/or load balancing. A cluster is usually viewed as a single entity by clients that use the cluster's services. In a system that is designed to provide high availability, a cluster can continue providing a particular application service to clients even if one of the nodes included in that cluster fails. In other words, programs executing on the cluster can continue to function despite a problem with one node in the cluster. For example, if one node within the cluster fails, an application executing on that node can be failed-over to another node within the cluster.

Clients can communicate with a clustered application (an application executing on one or more nodes within a cluster) via a communication protocol connection, such as a Transmission Control Protocol (TCP) connection. If the application is failed over to another node, any existing connections to that application should also be failed over (e.g., by failing over the application's Internet Protocol (IP) address and TCP state to the new node).

Typically, at least some delay is involved during the failover process. During this period of time, the lack of communication from the application may trigger certain behaviors (such as network congestion handling algorithms) within the communication protocol used to establish the connections. These behaviors may cause the connection to enter a period of decreased performance (e.g., such as occurs during a TCP exponential backoff period) or even lead to the termination of the connection. For example, during failover, a client may send a message to the application via an already-established TCP connection. If the application does not respond within a timeout period (e.g., because the application and/or the TCP connection are still in the process of being failed over), the TCP algorithms implemented on the client may interpret the lack of response as a sign of network congestion and, in response, enter an exponential backoff period. During exponential backoff, the client will insert exponentially increasing amounts of delay between successive messages to the application. Once the failover is complete, the amount of delay being used may be so great that it takes a significant amount of time (e.g., several minutes or more) for the client and application to resume normal (non-delayed) communication via the TCP connection.

Thus, if the connections are terminated or subjected to decreased performance as a result of the application being unable to respond during failover, it may take longer for the clients to reestablish communication with the application after failover is complete. Accordingly, techniques are desired to reduce the likelihood that undesirable communication protocol behavior will be triggered during failover.

SUMMARY

Various embodiments of methods and systems for maintaining a communication protocol connection during a failover are disclosed. One method involves obtaining a first value of a parameter associated with a communication protocol connection between a primary node and a client and sending a flow control message to the client, in response to detecting that the primary node is failed. The flow control message includes the parameter.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

According to the present invention, one node within a cluster operates as a primary node while another node within the cluster operates as a protection node. An application executing on the primary node establishes a communication protocol connection with a client. If the primary node fails, the cluster will detect the failure and begin failing the application over to another node. The protection node detects the failure and, while the application is being failed over, sends (and possibly even receives) communication protocol messages on behalf of the application being failed over. These communication protocol messages can be flow control messages requesting that the client temporarily cease sending new messages to the application. During the failover process, the protection node can also respond to any messages received via the connection that require a response. By sending messages to and responding to messages from the client, the protection node can reduce the likelihood that the client will perceive a significant disruption of traffic sent via the connection during the failover. This can in turn reduce the likelihood that communication protocol algorithms on the client will begin reducing the performance of the connection (e.g., by entering an exponential backoff period) in response to perceived network congestion. As a result, when the failover is finally complete, connection performance is less likely to be significantly degraded.

Figure 1:
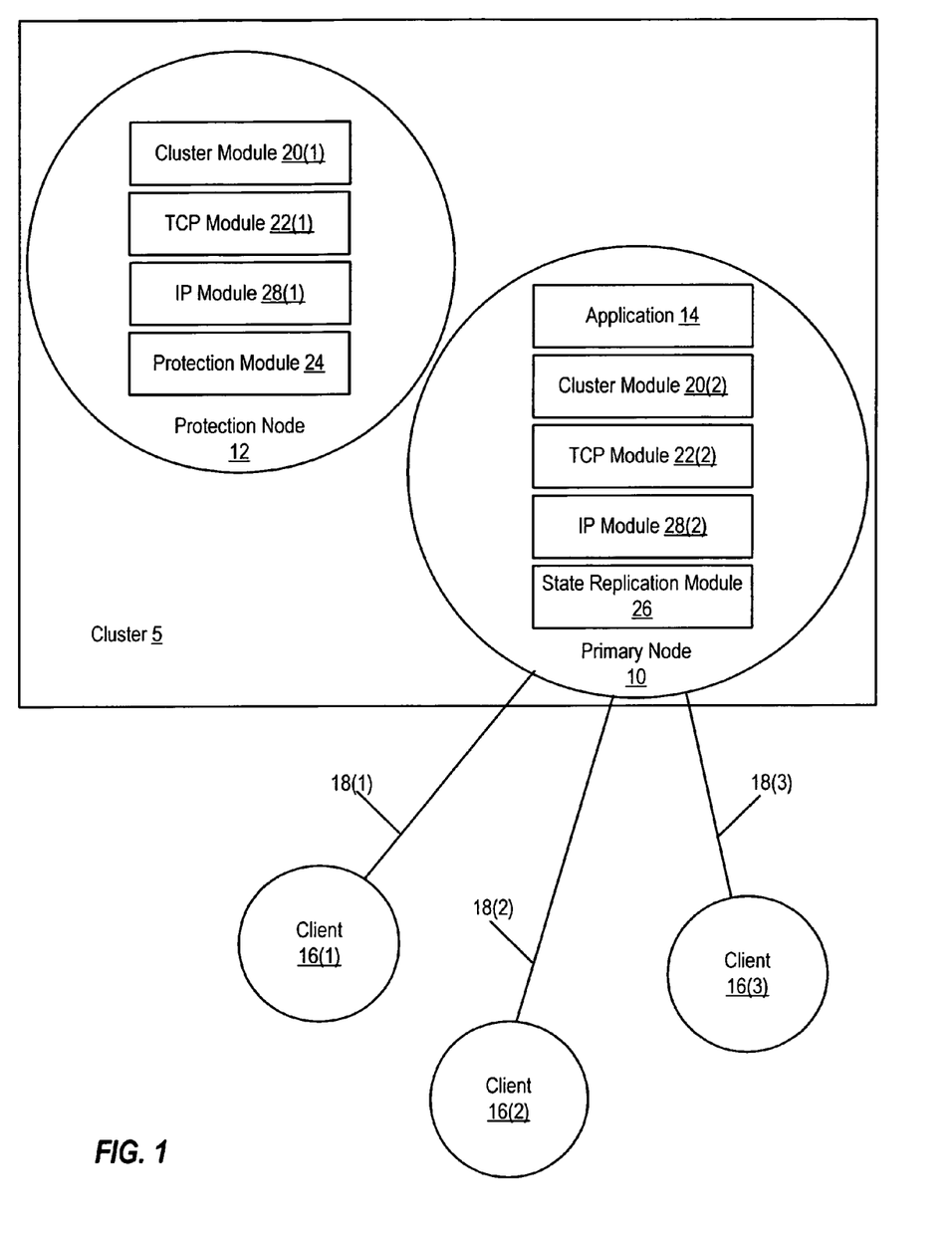
FIG. 1 is a block diagram of a cluster, according to one embodiment of the present invention.

FIG. 1 is a block diagram of a cluster 5. Cluster 5 includes a primary node 10 and a protection node 12. While only two nodes are shown in this example, it is noted that cluster 5 can have more than two nodes.

An application 14 executes on primary node 10. Several clients 16(1)-16(3) have established respective communication protocol connections 18(1)-18(3) with application 14. Clients 16(1)-16(3) can be coupled to cluster 5 via a WAN (Wide Area Network), such as the Internet, one or more LANs (Local Area Networks), one or more wireless networks, and the like. It is noted that a given cluster node can communicate with fewer or additional clients in other embodiments.

Primary node 10 and protection node 12 are coupled to communicate with each other by one or more networks. For example, primary node 10 and protection node 12 can be coupled by one or more private networks. Additionally, primary node 10 and protection node 12 can be coupled by one or more LANs and/or WANs. Private network(s) can be used to communicate cluster-specific messages, such as heartbeat messages and messages effecting cluster membership, among the nodes within cluster 5.

Protection node 12 implements a cluster module 20(1), a Transmission Control Protocol (TCP) module 22(1), and a protection module 24. Primary node 10 implements a cluster module 20(2), a TCP module 22(2), and a state replication module 26 (as indicated by the dashed lines, connection monitoring module 26 is optional and may not be included in some embodiments). Protection node 12 and primary node 10 also implement respective Internet Protocol (IP) modules 28(1) and 28(2).

In some embodiments, application 14 is a file system or database. For example, application 14 can be a backend application that provides access to data for a set of application servers, which act as clients 16(1)-16(3) of application 14. In general, application 14 is an application that communicates with one or more clients via respective communication protocol connections, such as connections 18(1)-18(3). In one embodiment, connections 18(1)-18(3) are TCP connections.

Cluster modules 20(1) and 20(2) each implement clustering software, such as VERITAS Cluster Server™, available from Symantec Corporation of Cupertino, Calif. Each cluster module 20(1) and 20(2) is able to identify which nodes are currently members of cluster 5. Additionally, clustering modules 20(1) and 20(2) are able to detect changes in cluster membership due to nodes leaving (e.g., due to failure) or joining cluster 5. In one embodiment, clustering modules within each node in cluster 5 exchange heartbeat messages via a private network that provides a low-latency transport mechanism. The private network can be implemented, for example, using a non-IP-based Ethernet network. The exchanged heartbeat messages (or lack thereof) can be used to determine the current cluster membership.

TCP modules 22(1) and 22(2) are examples of communication protocol modules that implement a communication protocol (TCP in the example of FIG. 1). IP modules 28(1) and 28(2) provide each node with the ability to communicate over an IP-based network (e.g., a network coupling cluster 5 to clients 16(1)-16(3). TCP modules 22(1) and 22(2) and IP modules 28(1) and 28(2) can be implemented in hardware and/or software. Additionally, TCP modules 22(2) may be integrated with application 14.

TCP module 22(2) can establish a connection with each of clients 16(1)-16(3). Application 14 can communicate with clients 16(1)-16(3) via the established connections 18(1)-18(3) respectively. Application 14 can send and receive TCP messages by interacting with TCP module 22(2). TCP module 22(2) can encapsulate data generated by application 14 into TCP messages, which are then passed to IP module 28(2) for transmission via an IP-based network to clients 16(1)-16(3).

State replication module 26 on primary node 10 is configured to provide information about connections 18(1)-18(3) to protection module 24. The information identifies the connections that have been established between application 14 on primary node 10 and clients 16(1)-16(3). A connection can be identified by the IP address of application 14, the IP address of the client using that connection, a TCP port used by application 14, and a TCP port used by the client when communicating via the connection. Each time that primary node 10 establishes a new connection or terminates an existing connection, state replication module 26 can send an updated set of information to protection module 24. In one embodiment, both state replication module 26 and protection module 24 are implemented at the software layer below the IP layer on primary node 10 and protection node 12 respectively.

State replication module 26 within primary node 10 is configured to provide one or more dynamic connection parameters (for each established connection between application 14 and a client) to protection node 12. These dynamic parameters can include window sizes, timestamps, sequence numbers, and the like. Such parameters are dynamic because the value of each parameter changes over time. For example, each time primary node 10 sends a new TCP message, TCP module 22(1) can increment the current sequence number. The dynamic parameters are included in each communication protocol message sent via the connection, and are used by the receiving device to determine whether a received communication protocol message is valid. Accordingly, in order to provide valid flow control messages and/or acknowledgements to clients if primary node 10 fails, protection node 12 needs to have the current values of the dynamic parameters associated with each connection. It is noted that, in some embodiments, there may only be one dynamic parameter per connection.

State replication module 26 can provide the parameters to protection node 12 in a variety of different ways. For example, state replication module 26 can send each new value of a connection parameter to protection module 24 of protection node 12 (e.g., by forwarding protection module 24 a copy of each communication protocol message sent via one of the connections 18(1)-18(3)). Alternatively, each time that the value of a connection parameter changes, state replication module 26 can store the new value of the connection parameter in a storage location that is also accessible to protection node 12 (e.g., such as a shared storage device coupled to cluster 5). Protection module 24 can read the connection parameters from this shared storage location in order to obtain the current value of each parameter.

In still other embodiments, state replication module 26 reroutes at least some, or even all, of the communication protocol messages being sent via each connection to protection node 12, and protection module 24 extracts the connection parameters from these rerouted messages. In one embodiment, state replication module 26 reroutes all communication protocol messages being sent via connections 18(1)-18(3) established between primary node 10 and clients 16(1)-16(3) to protection node 12.

Whenever communication protocol messages being sent via a particular connection are forwarded to protection node 12, the connection is (at least temporarily) rerouted through protection node 12. However, from the perspective of the clients, all communication protocol messages are received from and sent to the primary node 10.

Protection node 12 receives the communication protocol messages that are rerouted by state replication module 26, extracts the current value of the connection parameters, and rewrites the communication protocol messages for transmission to the appropriate client. A special message type or protocol type (e.g., indicated by the value of a message type field or protocol type field within the message) can be included within the version of the message sent from primary node 10 to protection node 12. Messages that include that special type will be processed by protection module 24 (e.g., the inclusion of that special type within a message can trigger protection module 24 to process the message). The special type is, in one embodiment, a special protocol type of a protocol field included in the IP header. Protection module 24 can include an IP filter driver that detects messages specifying that special protocol type within the protocol type field.

When, for example, a communication protocol message being sent from primary node 10 to client 16(1) via connection 18(1) is rerouted through protection node 12, state replication module 26 of primary node 10 can insert the destination Media Access Control (MAC) address of protection node 12 into the message and set the protocol type field of the IP header of the message to the value identifying the special protocol type. These two pieces of information respectively cause the message to be sent to protection node 12 and to be processed by protection module 24. Protection module 24 can extract the connection parameters from the message, rewrite the destination MAC address to identify the MAC address of a common gateway router (used to convey messages from primary node 10 to clients 16(1)-16(3)), and rewrite the protocol type field to identify the appropriate protocol (e.g., TCP). After being rewritten, the message will be sent to client 16(1). The other fields (e.g., source IP address) within the message will indicate that the message was sent by primary node 10.

Thus, state replication module 26 and protection module 24 operate to ensure that protection node 12 has a copy of the current values of the dynamic connection parameter(s) for each connection between application 14 and clients 16(1)-16(3). If primary node 10 fails, protection node 12 can use these values to communicate with clients 16(1)-16(3) via connections 18(1)-18(3) respectively.

As noted above, cluster module 20(1) within protection node 12 is configured to detect whenever a node leaves the cluster (e.g., by detecting the failure of that node to return a heartbeat message within a timeout period). Accordingly, if primary node 10 fails, cluster module 20(1) can quickly detect that failure and notify protection module 24 of the failure. Cluster module 20(1) (or a similar cluster module implemented on another node) can initiate the failover of application 14 to another node in response to detecting the failure of primary node 10. Failing over application 14 involves failing over the IP address used by application 14 as well as any open connections. The existing connections are failed over in a transparent manner (i.e., the existing connections are not terminated during failover).

In response to detecting the failure of primary node 10 through clustering services (as provided by cluster module 20(1)), protection module 24 begins sending flow control messages to each client 16(1)-16(3) that is communicating with primary node 10 via one of connections 18(1)-18(3). The flow control message sent to each client includes information indicating that the sender is asserting flow control (i.e., the sender cannot accept new packets). For example, if TCP is being used as the communication protocol (as in the example of FIG. 1), the flow control message can be an acknowledgement message (ACK) that specifies a zero window size. The flow control message also includes information (e.g., such as a source address) that indicates that the message is being sent by application 14.

Additionally, the flow control message includes a parameter (e.g., such as a sequence number or timestamp), the value of which is derived from the most recent parameter provided to protection module 24 from primary node 10. The new value of the parameter can be derived, for example, by incrementing the most recent sequence number received from primary node 10 or increasing the most recently received timestamp by an appropriate amount. For example, for the flow control message to be sent to client 16(1), protection module 24 can access the current value of the sequence number associated with connection 18(1), increment that value, and insert the new value of the sequence number into the flow control message. If additional flow control messages are subsequently sent to client 16(1), protection module 24 can continue to increment the current value of the sequence number associated with connection 18(1) before sending each additional flow control message. It is noted that protection module 24 can begin sending these flow control messages upon detection of the failure of primary node 10, before any of the network addresses (e.g., IP addresses) or applications implemented on primary node 10 have been failed over to another node. Protection module 24 can routinely (e.g., periodically and/or in response to prespecified stimuli) send additional flow control messages to clients 16(1)-16(3) throughout the failover process, until application 14 is finally restarted on another node within cluster 5.

Since the flow control messages sent by protection module 24 include the appropriate addressing information and dynamic parameters, clients 16(1)-16(3) will determine that the flow control messages are valid messages received from application 14 via an appropriate one of connections 18(1)-18(3). Receipt of the flow control message sent by protection module 24 causes the recipient to cease sending new messages to application 14 via one of connections 18(1)-18(3). Accordingly, clients 16(1)-16(3) will cease sending new messages via connections 18(1)-18(3) upon receiving the flow control messages from protection node 12. Since clients 16(1)-16(3) are no longer sending new messages to application 14 via connections 18(1)-18(3), clients 16(1)-16(3) are unlikely to encounter the situation in which messages are not acknowledged within a timeout period, as might otherwise happen while application 14 is temporarily unavailable during the failover process. Accordingly, network congestion control algorithms implemented on clients 16(1)-16(3) are unlikely to detect unacknowledged messages and consequentially cause connections 18(1)-18(3) to enter reduced performance modes (e.g., such as TCP exponential backoff).

While clients 16(1)-16(3) will stop sending new messages via connections 18(1)-18(3) in response to receiving the flow control messages sent by protection module 24, clients 16(1)-16(3) can still retransmit any unacknowledged messages that were previously transmitted to application 14 (such messages are messages that were not acknowledged within a timeout period). In order to prevent these messages from being unacknowledged again (and thus causing the sending client to potentially begin throttling the connection), protection module 24 can take steps to have such messages transmitted to protection node 12, so that protection module 24 can promptly detect and acknowledge those messages. To do this, protection module 24 (or cluster module 20(1)) can initiate the failover of the IP address used by application 14 to protection node 12 (this IP address failover occurs, for example, if protection node 12 is the node to which application 14 is being failed over). To increase the speed with which messages addressed to the IP address are rerouted to protection node 12, protection module 24 can also send an Address Resolution Protocol (ARP) response packet to the local gateway (not shown) after the IP address has failed over to protection node 12, which causes the local gateway to update its ARP state information to indicate that packets addressed to the IP address should now be sent to protection node 12, not primary node 10.

Once the IP address has failed over to protection node 12, any retransmitted messages sent by clients 16(1)-16(3) via connections 18(1)-18(3) will be received by protection node 12. Protection module 24 detects these messages and generates appropriate acknowledgments to the sending clients. Like the flow control messages, these acknowledgments appear to have been sent by the TCP module on the node to which application 14 is being failed over. These acknowledgments also contain the appropriate value (e.g., generated by incrementing or otherwise modifying the current value of that parameter) of each dynamic parameter associated with the connection on which the acknowledgements are sent.

Additionally, protection module 24 can buffer any retransmitted messages received from clients 16(1)-16(3) for later processing by application 14, once failover is complete. The messages can be buffered in storage local to protection node 12, if application 14 is being failed over to protection node 12. Alternatively, the messages can be buffered on a storage device that is shared by nodes in cluster 5, if, for example, application 14 is being failed over to a node other than protection node 12. As yet another alternative, protection module 24 can buffer the messages locally and then send copies of the messages to application 14 once application 14 has restarted on another node.

In addition to retransmitted messages, clients 16(1)-16(3) can also send probes while protection module 24 is asserting flow control. After the IP address has been failed over, the probes will be sent to protection node 12 and handled by protection module 24. Protection module 24 is configured to promptly respond to the probes, using the appropriate addressing information and dynamic parameter values.

Once failover completes (e.g., once application 14 and any functionality, such as IP address, used by application 14 have been restarted on another node), application 14 can begin communicating with clients 16(1)-16(3) via connections 18(1)-18(3). At this time, protection module 24 ceases to respond to messages from the clients and also ceases to send flow control messages to the clients. Protection module 24 (or the TCP module on the node on which application 14 has been restarted) deasserts flow control (e.g., by sending redundant acknowledgment (ACK) messages that specify a non-zero window size to the clients), which allows the clients to begin sending new messages via connections 18(1)-18(3). The value of the window size can be derived from the value that was saved (e.g., by protection module 24 and/or TCP module 22(2)) before the failover. Since a significant portion (or even all) of the messages sent by clients 16(1)-16(3) during the failover process have been acknowledged by protection module 24, the clients are unlikely to have throttled connections 18(1)-18(3). Accordingly, communication between application 14 and clients 16(1)-16(3) is likely to resume in a non-degraded mode.

In some embodiments, cluster 5 includes more than two nodes. In such an embodiment, if protection node 12 fails, cluster 5 can fail protection module 24 over to another node (or otherwise configure another node as a new protection node). Cluster module 20(1) can detect the failure of protection node 12 and notify state replication module 26, which can then begin sending information identifying the established connections and rerouting messages to the new protection node.

In some embodiments, protection node 12 acts as both a protection node and as a backup node for application 14. In such embodiments, application 14 is failed over to protection node 12 if node 10 fails. During the time that the failover is being performed, protection module 24 will send flow control messages and responses, as appropriate, to clients 16(1)-16(3). Alternatively, additional nodes can be included within cluster 5, and a separate node (other than protection node 12) can be designated as the backup node for application 14. Additionally, it is noted that protection node 12 can act as a protection node (i.e., a node that will send flow control messages on behalf of another node if the other node fails) for multiple primary nodes.

Each client 16(1)-16(3), as well as primary node 10 and protection node 12 (collectively referred to as nodes 10 and 12) can include one or more computing devices configured to execute software implementing various applications (e.g., an application server, a database application, a file system, a volume manager, or the like). Computing devices can include workstations, personal computers, servers, PDAs (Personal Digital Assistants), cell phones, storage network switches, storage devices, storage array controllers, or any other devices configured to execute software implementing such applications. Alternatively, clients 16(1)-16(3) and/or nodes 10 and 12 can be implemented from one or more logic devices (e.g., PLDs, FPGAs, and the like) configured to perform the functions of such applications. Clients 16(1)-16(3) and/or nodes 10 and 12 can also be implemented using logic devices that are configured to perform some of the functions of the applications and that are also configured to execute software implementing other functions of the applications.

Additionally, in some embodiments, several nodes and/or clients are implemented in a single physical computing device. For example, a multiprocessor computer system can be subdivided into several virtual machines, each of which is used to implement one of the nodes 10 and 12 in cluster 5. A single physical computing device can also implement both a client and a node.

Figure 2:
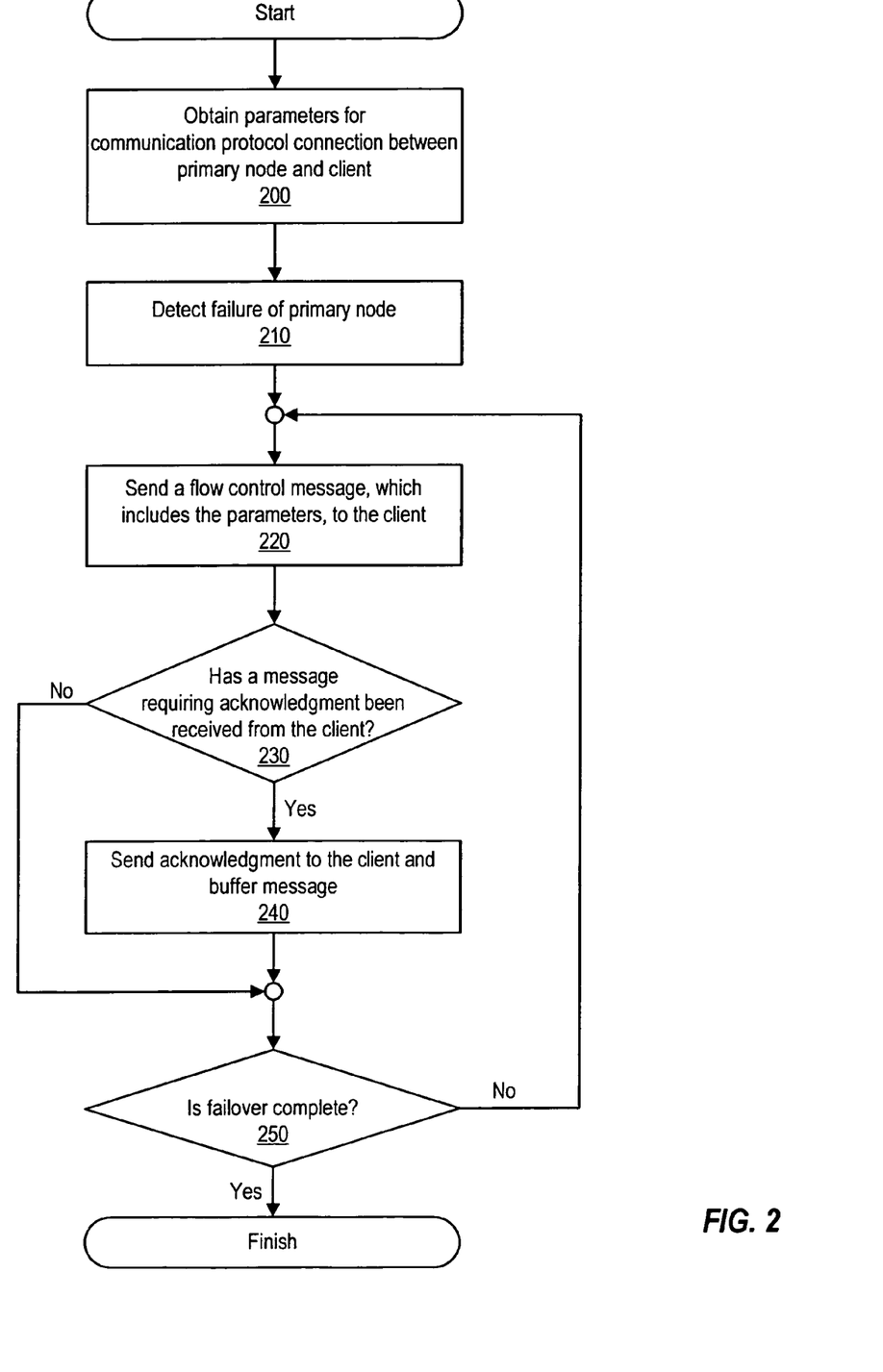
FIG. 2 is a flowchart of a method of maintaining a communication protocol connection during a node failover, according to one embodiment of the present invention.

FIG. 2 is a flowchart of a method of maintaining a communication protocol connection during a failover. The connection is "maintained" in that the connection does not experience significantly degraded performance (e.g., such as the performance degradation caused by exponential backoff algorithms) as a result of a failover. This method can be performed by a device such as protection node 12 of FIG. 1.

The method begins at 200, when the protection node obtains the current value of any dynamic parameters associated with the connection between the primary node and the client. These dynamic parameters can include a window size, sequence number, and/or timestamp, as well as other information appropriate to the particular communication protocol being used. The parameters can be obtained, for example, by extracting the parameters from a message being sent from the primary node to the client, by receiving the parameters directly from the primary node, or by reading the parameters from a storage location written to by the primary node. If the message sent from the primary node to the client is being rerouted via the protection node, the protection node can also rewrite the message for transmission to the client.

At 210, the protection node detects the failure of the primary node through the use of cluster services. In response to detecting the failure of the node, the protection node sends a flow control message to the client, as shown at 220. The flow control message includes the appropriate value of the parameters (e.g., derived from the parameter values obtained at 200). Accordingly, the flow control message will be identified as a legal communication protocol message by the receiving client.

In at least some embodiments (e.g., such as embodiments in which the protection node is also the backup node to which the application executing on the failed node will be failed over), the network address (e.g., the IP address) used by the application is failed over to the protection node, so that any messages sent by the client during the failover process will be rerouted to the protection node. Once the network address has been failed over, the protection node may receive messages from the clients. Accordingly, if a message (such as a retransmitted message or a probe) that requires acknowledgment or other response is received from the client, as detected at 230, the protection node will send an appropriate acknowledgment and/or response, as show at 240. The protection node can also buffer the received message. Once the application is restarted on the backup node, the protection node can provide any buffered messages to the application for processing.

Throughout the duration of the failover process, the protection node can continue to send messages asserting flow control at appropriate intervals (e.g., once every second) and also continue to respond to messages received from the clients. Thus, if the failover is not yet complete, as determined at 250, the method can repeat operations 220, 230, and 240. After the failover is complete, the protection node ceases to respond to client messages (the TCP module on the node to which the application was failed over will respond to those messages after failover) and also deasserts (or at least ceases to assert) flow control (in some embodiments, the TCP module on the node to which the application was failed over can deassert flow control at the appropriate time).

Figure 3:
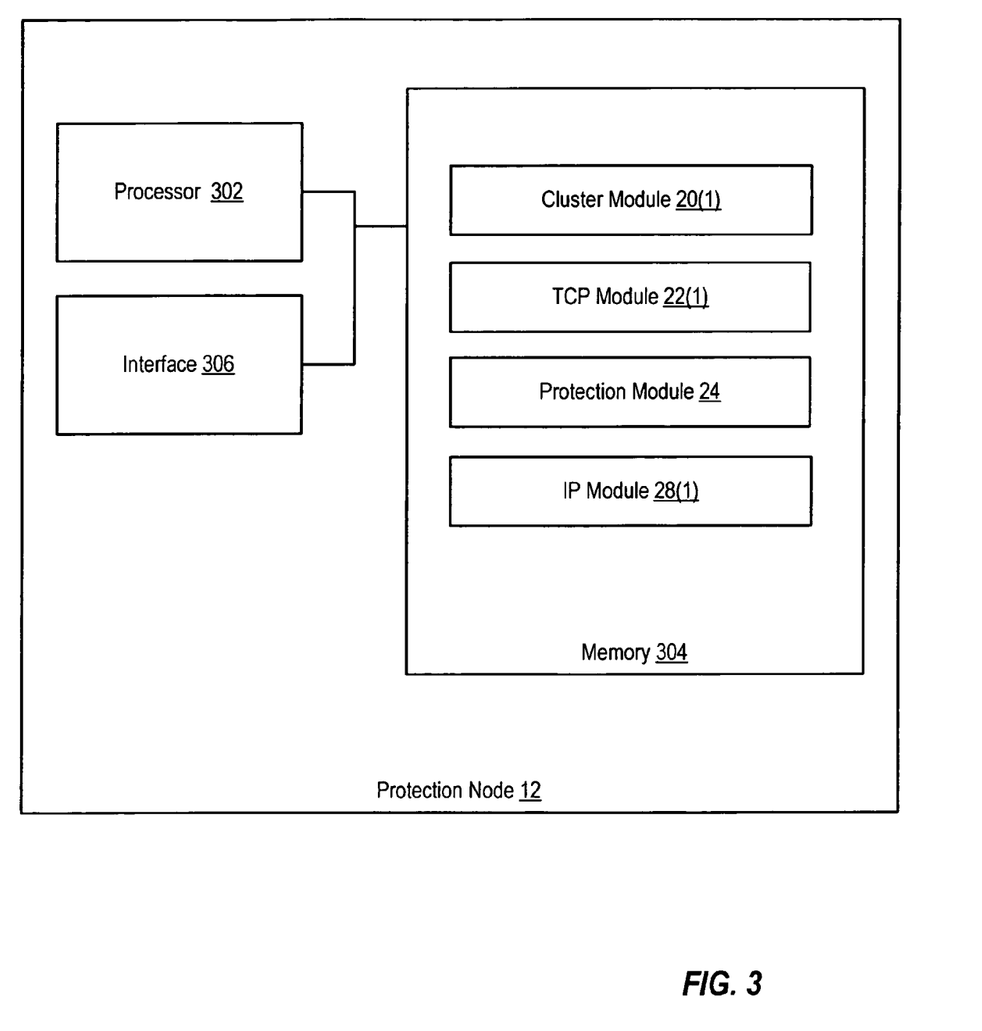
FIG. 3 is a block diagram of a node, according to one embodiment of the present invention.

FIG. 3 is a block diagram of a protection node 12 (e.g., as shown in FIG. 1). It is noted that other nodes, such as primary node 10, can be implemented similarly. As illustrated, protection node 12 includes one or more processors 302 (e.g., microprocessors, PLDs (Programmable Logic Devices), or ASICs (Application Specific Integrated Circuits)) configured to execute program instructions stored in memory 304. Memory 304 can include various types of RAM (Random Access Memory), ROM (Read Only Memory), Flash memory, MEMS (Micro Electro-Mechanical Systems) memory, and the like. Protection node 12 also includes one or more interfaces 306. Processor 302, interface 306, and memory 304 are coupled to send and receive data and control signals by a bus or other interconnect.

Interface 306 can include a network interface to various networks and/or interfaces to various peripheral buses. Interface 306 can include an interface to one or more storage devices. Interface 306 can also include an interface to a backplane or other private communications network, for use in communicating with other nodes within the cluster.

In this example, program instructions executable to implement cluster module 20(1), TCP module 22(1), protection module 24, and IP module 28(1) are stored in memory 304. Protection module 24 can perform a method like the one shown in FIG. 2.

The program instructions and data implementing protection module 24 can be stored on various computer readable media such as memory 304. In some embodiments, such software is stored on a computer readable medium such as a CD (Compact Disc), DVD (Digital Versatile Disc), hard disk, optical disk, tape device, floppy disk, and the like). In order to be executed by processor 302, the instructions and data implementing the protection module are loaded into memory 304 from the other computer readable medium. The instructions and/or data implementing the protection module can also be transferred to protection node 12 for storage in memory 304 via a network such as the Internet or upon a carrier medium. In some embodiments, a computer readable medium is a carrier medium such as a network and/or a wireless link upon which signals such as electrical, electromagnetic, or digital signals, on which the data and instructions implementing a virtualization module are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
obtaining a first value of a parameter associated with a communication protocol connection between a primary node of a cluster and a client, wherein
the first value is included in a message sent by the primary node,
the parameter comprises at least one of a window size, sequence number, or timestamp, and
an application is executing on the primary node; and
sending a flow control message to the client, in response to detecting that the primary node is failed, wherein
the flow control message indicates that the flow control message is sent by the application,
the flow control message comprises the parameter,
the parameter indicates that the flow control message is valid,
the flow control message indicates that new packets cannot be accepted from the client via the communication protocol connection, and
the obtaining and the sending are performed by a protection node of the cluster.

2. The method of claim 1, further comprising:
deriving a second value of the parameter from the first value, wherein the flow control message comprises the second value of the parameter.

3. The method of claim 1, wherein
receipt of the flow control message causes the client to cease sending new messages via the communication protocol connection.

4. The method of claim 3, wherein
the communication protocol connection is a Transmission Control Protocol (TCP) connection.

5. The method of claim 4, further comprising:
receiving a message from the client via the communication protocol connection; and
sending an acknowledgment corresponding to the message to the client.

6. The method of claim 4, further comprising:
in response to the detecting that a failover is incomplete, sending a plurality of flow control messages, wherein
the sending comprises continuing to send flow control messages to the client, until the application executing on the primary node fails over to a secondary node.

7. The method of claim 4, wherein the obtaining the first value of the parameter associated with the communication protocol connection comprises:
receiving a message being sent via the communication protocol connection, wherein
the message is being sent from the primary node to the client via the protection node, and the message comprises a value that identifies a special protocol type; and extracting the first value of the parameter from the message.

8. The method of claim 7, further comprising rewriting the message for transmission to the client, wherein the rewriting comprises:

replacing a first media access control destination address, which identifies a protection node, with a second media access control destination address, which identifies a common gateway; and replacing the special protocol type with a value that identifies the communication protocol.

9. A system comprising:

a computing device configured as a protection node in a cluster, wherein the computing device comprises:

an interface;

a cluster module, wherein the cluster module is configured to detect node failures within a cluster; and a protection module coupled to the cluster module, wherein the protection module is configured to:

obtain a first value of a parameter associated with a communication protocol connection between a client and a primary node in the cluster, wherein the first value is included in a message sent by the primary node, the parameter comprises at least one of a window size, sequence number, or timestamp, and the primary node is configured to execute an application; and send a flow control message to the client, via the interface, if the cluster module detects that the primary node is failed, wherein the flow control message indicates that the flow control message is sent by the application, the flow control message comprises the parameter, and the parameter indicates that the flow control message is valid, the flow control message indicates that new packets cannot be accepted from the client via the communication protocol connection.

10. The system of claim 9, wherein receipt of the flow control message causes the client to cease sending new messages via the communication protocol connection, and the communication protocol connection is a Transmission Control Protocol (TCP) connection.

11. The system of claim 10, further comprising:

the primary node, wherein the primary node is configured to send a TCP message, via the protection node, to the client via the communication protocol connection, the TCP message comprises a destination address, and the destination address identifies the protection node.

12. The system of claim 11, wherein the protection module is configured to:

extract the first value of the parameter from the TCP message;

update the destination address to identify a common gateway; and send the TCP message to the common gateway.

13. The system of claim 10, wherein the protection module is configured to:

receive a message from the client via the communication protocol connection; and send an acknowledgment corresponding to the message to the client.

14. The system of claim 13, wherein the protection module is configured to, in response to the detecting that a failover is incomplete:

send a plurality of flow control messages, wherein the sending comprises continuing to send flow control messages to the client, until the application fails over to a secondary node.

15. A computer readable storage medium comprising program instructions executable to:

obtain a first value of a parameter associated with a communication protocol connection between a primary node of a cluster and a client, wherein the first value is included in a message sent by the primary node, the parameter comprises at least one of a window size, sequence number, or timestamp, and an application is executing on the primary node; and send a flow control message to the client, in response to detecting that the primary node is failed, wherein the flow control message indicates that the flow control message is sent by the application, the flow control message comprises the parameter, the parameter indicates that the flow control message is valid, the flow control message indicates that new packets cannot be accepted from the client via the communication protocol connection, and the obtaining and the sending are performed by a protection node of the cluster.

16. The computer readable storage medium of claim 15, wherein receipt of the flow control message causes the client to cease sending new messages via the communication protocol connection, and the communication protocol connection is a Transmission Control Protocol (TCP) connection.

17. The computer readable storage medium of claim 16, wherein the program instructions are further executable to:

detect reception of a message from the client via the communication protocol connection; and send an acknowledgment corresponding to the message to the client.

18. The computer readable storage medium of claim 16, wherein the program instructions are further executable to, in response to the detecting that a failover is incomplete:

send a plurality of flow control messages, wherein the sending comprises continuing to send flow control messages to the client, until the application executing on the primary node fails over to a secondary node.

19. The computer readable storage medium of claim 16, wherein the program instructions are executable to obtain the first value of the parameter by extracting the parameter from a message being sent from the primary node to the client via the communication protocol connection.

20. A system comprising:

network interface means for communicating via a network;

means for obtaining a first value of a parameter associated with a communication protocol connection between a primary node of a cluster and a client, wherein the first value is included in a message sent by the primary node, the parameter comprises at least one of a window size, sequence number, or timestamp, and the primary node is configured to execute an application; and means for sending a flow control message to the client via the network interface means, in response to detecting that the primary node is failed, wherein
the flow control message indicates that the flow control message is sent by the application,
the flow control message comprises the parameter,
the parameter indicates that the flow control message is valid,
the flow control message indicates that new packets cannot be accepted from the client via the communication protocol connection, and
a protection node of the cluster comprises the network interface means, the means for obtaining and the means for sending.

21. The system of claim 20, wherein
receipt of the flow control message causes the client to cease sending new messages via the communication protocol connection, and
the communication protocol connection is a Transmission Control Protocol (TCP) connection.

* * * * *